United States Patent [19]

Peck et al.

[11] Patent Number: 5,171,069
[45] Date of Patent: Dec. 15, 1992

[54] ANTILOCK BRAKE SYSTEM AND METHOD INCORPORATING A PRESSURE FEEDBACK

[75] Inventors: David E. Peck, Rochester Hills; Bryan R. Murphy, Drayton Plains, both of Mich.

[73] Assignee: Rockwell International Corporation, Pittsburgh, Pa.

[21] Appl. No.: 513,137

[22] Filed: Apr. 23, 1990

[51] Int. Cl.$^5$ .............................. B60T 8/00; B60T 8/32
[52] U.S. Cl. .................................. 303/100; 303/118.1; 303/DIG. 3; 303/DIG. 4
[58] Field of Search ................. 303/118, 119, DIG. 3, 303/DIG. 4, 100, 95, 94, 97, 96, 99, 102, 103, 104, 119 R, 105, 110, 93, 113 R; 188/181 A, 181 R

[56] References Cited

U.S. PATENT DOCUMENTS

| | | | |
|---|---|---|---|
| 3,836,209 | 9/1976 | Neisch | 303/118 |
| 3,857,614 | 12/1974 | Kurichl | 303/118 |
| 3,893,696 | 7/1975 | Urban et al. | 303/118 |
| 3,902,764 | 9/1975 | Sebo | 303/118 |
| 4,093,316 | 6/1978 | Reinecke | 303/DIG. 4 X |
| 4,123,116 | 10/1978 | Carp et al. | 303/DIG. 4 X |
| 4,175,795 | 11/1979 | Mortimer et al. | 303/118 |
| 4,210,370 | 7/1980 | Mortimer | 303/118 |
| 4,585,280 | 4/1986 | Leiber | 303/DIG. 4 X |

Primary Examiner—Douglas C. Butler

[57] ABSTRACT

An air brake system for a truck includes a treadle valve, a pilot control isolation valve, an exhaust valve, a relay valve, an air pressure transducer, a wheel speed sensor, an electronic control unit (ECU) and an air brake chamber associated with a brake actuator. In heavy braking operations, the pilot system pressure rise rate is monitored and restricted by modulation of the pilot control isolation valve. During heavy braking operations, if braking of the vehicle wheel results in a wheel velocity change which exceeds a predetermined deceleration threshold, the pressure rise rate is further restricted in attempt to "creep" up on the brake system pressure at which the lock condition is expected to occur. At another predetermined deceleration threshold, the brake system pressure is vented. The brake system pressure decreases resulting in a reduction in the applied brake force thereby permitting the vehicle wheel to roll back up to speed. The roll up rate is a function of the friction force. The friction force is used to control parameters of operation of the antilock brake system during subsequent antilock cycles.

36 Claims, 5 Drawing Sheets

ANTILOCK BRAKE SYSTEM AND METHOD INCORPORATING A PRESSURE FEEDBACK

BACKGROUND OF THE INVENTION

1. Field of the Invention

This invention relates to antilock brake systems; and more particularly, to antilock brake systems utilizing brake system pressure feedback to control brake force.

2. Description of the Related Art

Antilock brake systems typically comprise a feedback control that modulates brake system pressure in response to monitored wheel velocity to control the percentage of wheel slip during braking. The objective of the antilock system is to maximize utilization of available tire traction thereby minimizing stopping distance while maintaining vehicle stability. Elements of a typical antilock system include; a treadle valve (operated by the drivers foot), a system pressure modulation device, a wheel speed sensor and an electronic control unit (ECU). During braking a wheel lock condition is sensed by the ECU when the vehicle wheel speed achieves a predefined value of deceleration. When such a condition is detected, the system pressure modulation device reduces system pressure permitting the wheel to roll back up from the locked condition. At the beginning of the braking operation, the ECU produces a reference velocity which is a projection based upon the braking performance the vehicle is capable of achieving. Thus, the reference velocity is an artificial signal which is a projection of vehicle speed during a braking operation. When the wheel rolls up to the reference velocity, the system pressure modulation device increases system pressure thereby reapplying braking force. This process is repeated until the vehicle is stopped or the operator releases force on the treadle valve. Problems associated with known antilock systems include;

1. In a braking condition in which excess brake force is available (i.e., the vehicle is lightly loaded or the coefficient of friction on the road surface is low) the brake system pressure rise rate may easily exceed the brake system pressure necessary to appropriately control the vehicle wheel velocity. Therefore, the vehicle wheels are easily locked. Hysteresis in the braking system results in a delay in the apply and the release of brake force, and therefore, extends the time that the vehicle wheel is excessively braked. This increases stopping distance and reduces vehicle stability.

Therefore, there is a need for a system that modulates the rise in system pressure to a rise rate which matches the response of the system to avoid or minimize brake pressure overshoot thus avoiding excessive brake force overshoot.

2. When antilock systems reapply after a first cycle, the brake pressure rise rate again may easily exceed the brake system pressure necessary to appropriately control the vehicle wheel velocity.

Therefore, there is a need for an antilock system which stores the system pressure at which excess brake force occurred and uses this value in subsequent braking cycles to creep up to an appropriate brake force condition.

3. When antilock systems reduce system pressure in response to detection of an excess brake force condition, the system pressure is typically reduced to a target of zero psig.

1) as fast as possible; or,
2) according to a fixed schedule.

When the wheel velocity minimum is reached and the ECU generates a command to raise system pressure to reapply brake force, the brake system pressure is often well below the brake system pressure which would generate the appropriate brake force for the respective condition. Time is lost in raising system pressure to an appropriate value.

Therefore, there is a need for an antilock system which will reduce brake system pressure to a value which minimizes the time lost to rebuild pressure in response to an ECU command to reapply brake force.

SUMMARY OF THE PRESENT INVENTION

The present invention as adapted to an air brake system for a truck includes a treadle valve (operated by the driver's foot), a pilot control isolation valve, an exhaust valve, a relay valve, an air pressure transducer, a wheel speed sensor, an electronic control unit (ECU) and an air brake chamber associated with a brake actuator. In heavy braking operations, the pilot system pressure rise rate is monitored and restricted by modulation of the pilot control isolation valve. During heavy braking operations, if braking of the vehicle wheel results in a wheel velocity change which exceeds a predetermined deceleration threshold, the pressure rise rate is further restricted in attempt to "creep" up on the brake system pressure at which the lock condition is expected to occur.

At another predetermined deceleration threshold, the brake system pressure is vented. Upon venting, brake system pressure decreases resulting in a reduction in the applied brake force thereby permitting the vehicle wheel to roll back up to speed. The roll up rate is a function of the applied brake force, coefficient of friction of the road surface and the loading of the respective vehicle wheel (i.e., the friction force available for stopping the vehicle). Empirical testing has revealed that a close approximation of the friction force available for stopping the vehicle may be made by use of the pilot system pressure when the vehicle wheel reaches minimum velocity and the time required to reach a certain wheel velocity greater than the minimum veloeity. The friction force may be used to control parameters of operation of the antilock brake system during subsequent antilock cycles. For example, subsequent cycle brake system pressure rise rate is restricted by values determined from the friction force noted from previous cycles. Also, the deceleration condition at which the brake system pressure is exhausted and the pressure to which the system is exhausted are determined from the calculation of the friction force available during previous cycles.

These and other aspects of the present invention will become more readily apparent by reference to the following detailed description of the embodiments as shown in the drawings.

DESCRIPTION OF THE PREFERRED EMBODIMENT

Figure 1:
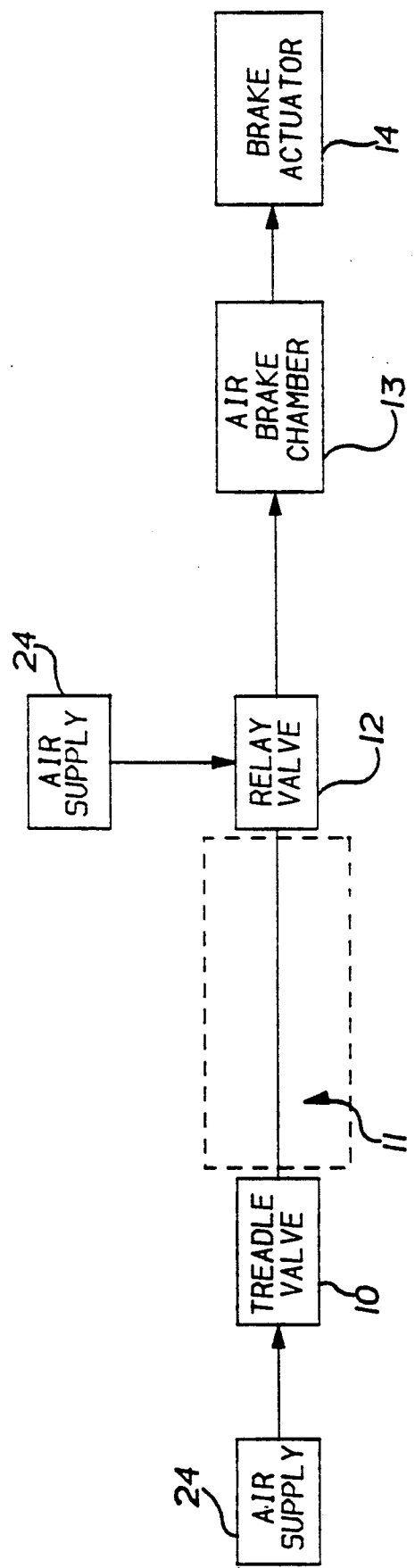
FIG. 1 is a conventional air brake system.

A flow diagram of the functional elements of a conventional air brake system is illustrated in FIG. 1 including a treadle valve 10 which controls the pressure in a pilot system 11 which controls a relay valve 12 which controls the pressure in air brake chamber 13 associated with brake actuator 14. In operation, the driver depresses treadle valve 10 admitting an amount of air from regulated supply reservoir 24 into pilot system 11. As a consequence, pressure builds in pilot system 11 providing a proportional displacement of a spring returned piston (not shown) in relay valve 12. The piston exposes an orifice which releases air, at a rate proportionate to piston displacement from air reservoir 24, thereby providing a pressure to brake actuator 14. Therefore, the amount the driver depresses treadle valve 10 determines the amount of brake force provided by brake actuator 14. In operation, conditions may arise in which the vehicle is lightly loaded or the coefficient of friction between the vehicle wheels and the road surface is reduced, in which the ability of a conventional braking system to stop the vehicle is impaired. That is, if the braking system reduces vehicle wheel velocity to a value less than approximately 80% of vehicle speed, a region of instability is encountered in which the wheel may rapidly enter a lock condition which causes the vehicle stability to be impaired and stopping distance to be increased. Any brake operation in which the wheel speed is reduced to a value less than 80% of vehicle speed is known as a condition of excess brake force.

Figure 2:
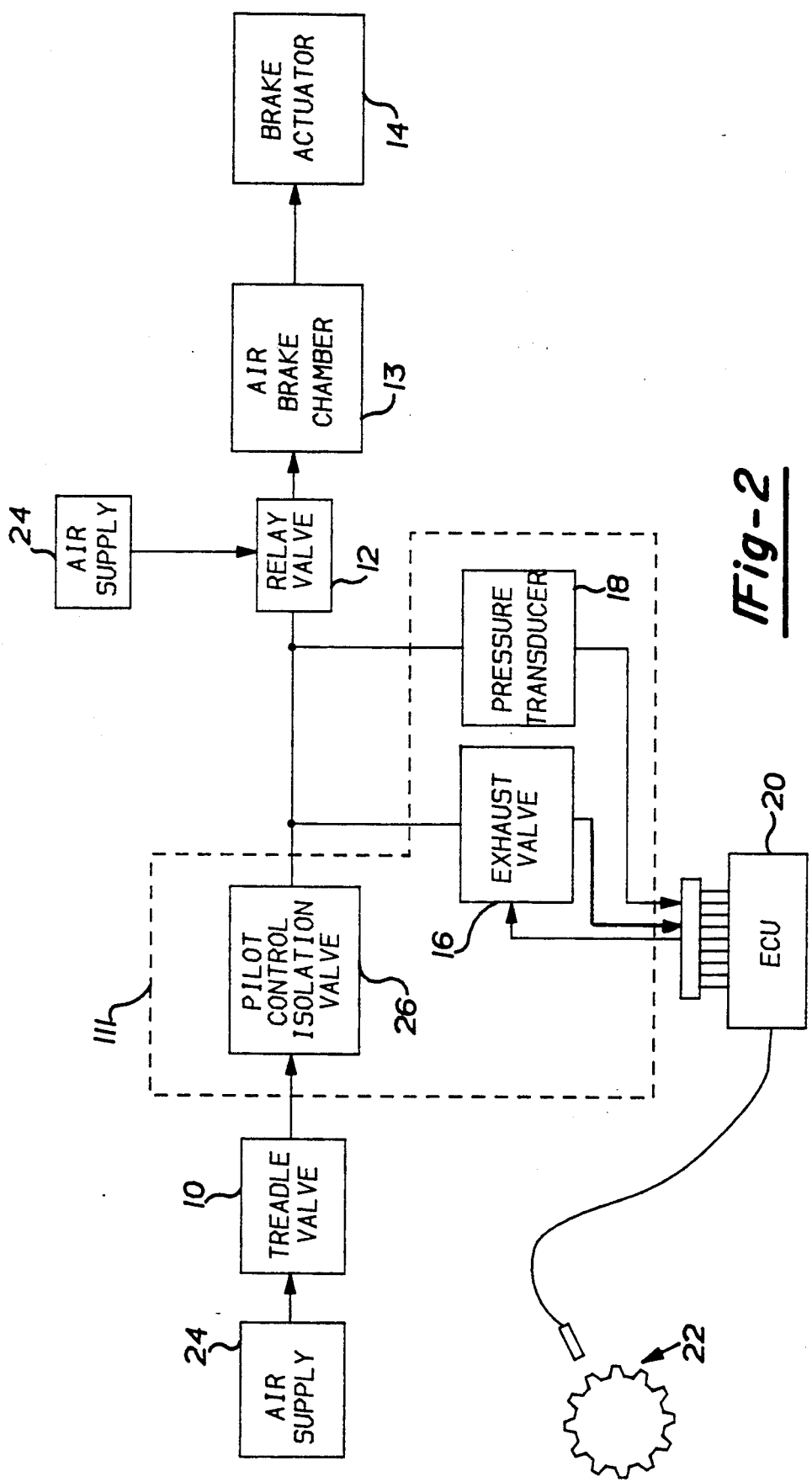
FIG. 2 is a conventional air brake system including additional elements as contemplated by the present invention.

It is under conditions of excess rise rate of treadle pressure or excess brake force that the additional elements required to accomplish the antilock function of the present invention come into play. The present invention as shown in FIG. 2 is similar to a conventional system but includes additional elements. These additional elements include a solenoid controlled exhaust valve 16, air pressure transducer 18, ECU 20, wheel speed sensor 22 providing indicia of average wheel speed and pilot control isolation valve 26. The pilot portion of the air brake system of the present invention is shown as 111.

Figure 3:
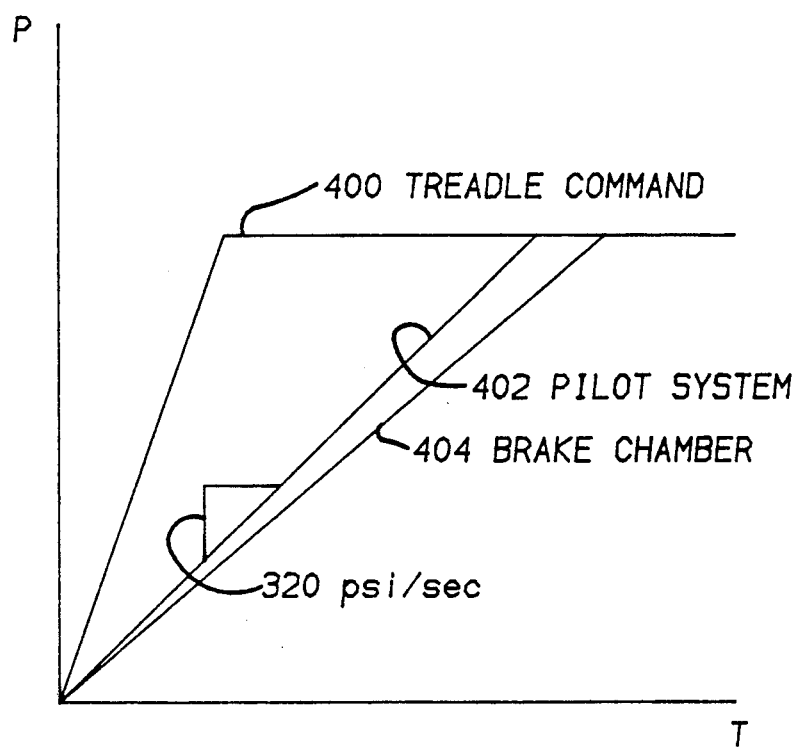
FIG. 3 illustrates the conditions occurring in a brake system incorporating the present invention when braking in a nonexcess brake force manner.

The operation of a braking system as intended by the present invention in a nonexcess brake force application is illustrated by FIG. 3. A brake system operation command produced by the vehicle driver depressing treadle valve 10 is illustrated by plot 400. If the pressure rise rate exceeds a predetermined threshold say of 320 psi/s, as measured in 15 millisecond increments, as detected by air pressure transducer 18, ECU 20 will provide a command to pilot control isolation valve 26 to modulate pilot system 111 pressure rise rate as illustrated by plot 402. The consequent brake chamber air pressure rise rate is illustrated by plot 404. It should be noted that, FIG. 3 illustrates the distinction between pilot system pressure rise rate in a conventional unmodulated system 11 (plot 400) versus the modulated pressure rise rate of pilot system 111 of the present invention (plot 402). Further, it should be noted that the pilot system pressure rise rate shown in plot 402 is controlled in a manner such that it slightly leads the pressure rise rate of the brake chamber 404.

Figure 4A:
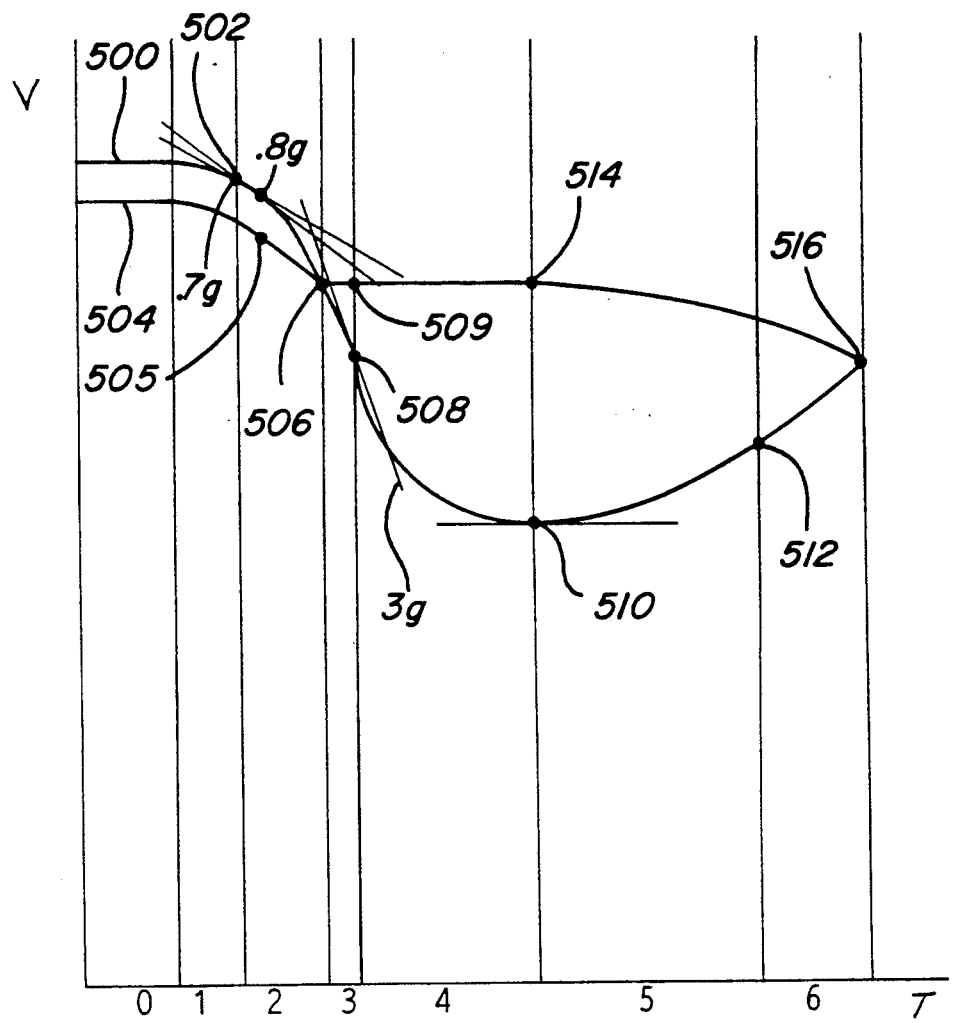
FIG. 4A illustrates the first cycle velocity characteristics of the vehicle wheel and the respective reference velocity during an excess brake force stop.
Figure 4B:
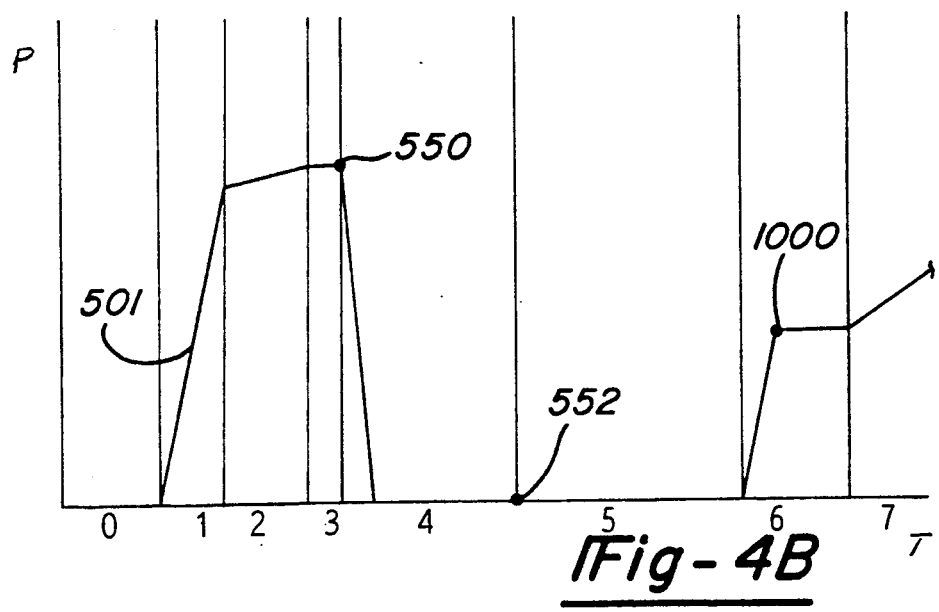
FIG. 4B illustrates the first cycle brake system pressure during an excess brake force stop.

The performance of the system as intended by the present invention operating in an excess brake force mode, is illustrated in FIGS. 4A, B and 5A, B. Referring specifically to FIG. 4A, vehicle wheel velocity as measured by speed sensor 22 is shown by plot 500. The wheel velocity referred to herein is the tangential velocity of a point moving in rotation at the rolling radius of the vehicle wheel relative to the respective axle. Appropriate units for wheel velocity are; ft/s. Differentiation of the wheel velocity provides the respective wheel acceleration which is expressed herein in units of g. Coincident pilot system 111 pressure is shown in FIG. 4B as plot 501. Prior to any attempt to stop the vehicle, shown as region 0, a reference velocity 504 is calculated using the formula;

vehicle wheel velocity (as measured by wheel speed sensor 22)×0.95=reference velocity.

It is to be noted that if the reference velocity calculation falls below 5 ft/s, the antilock stratagem of the present invention is not activated. At the transition into region 1 the driver applies force to treadle valve 10 causing pressure to rise in pilot system 111. As previously described for both nonexcess brake force mode as well as excess brake force mode, the pilot system pressure rise rate of the present invention is monitored and limited to a rise rate of 320 psi/s by modulation of pilot control isolation valve 26. The consequent pilot system pressure rise rate is shown in region 1 of FIG. 4B. Pilot system pressure rise produces a respective rise in pressure in brake chamber 13, thereby producing a brake force which decreases vehicle wheel velocity. If a braking condition occurs in which the vehicle wheel velocity is decreasing such that the wheel experiences a deceleration which exceeds a predetermined threshold, for example, 0.7 g as shown at point 502 of FIG. 4A, ECU 20 initiates the first antilock cycle as intended by the present invention. The 0.7 g threshold has been selected based upon the peak friction available between the vehicle wheel and a dry road surface. When the 0.7 g threshold is detected, the pilot system pressure rise rate is restricted to a rise rate of 64 psi/s in 15 millisecond increments. (See region 2 of FIG. 4B) by modulation of pilot control isolation valve 26. This reduces the pilot pressure rise rate in an effort to "creep" toward an anticipated wheel lock condition. The reference velocity entering region 2 continues to be based upon the formula;

vehicle wheel velocity×0.95=reference velocity.

When a vehicle wheel deceleration of 0.8 g is detected, a new reference velocity is provided. The new reference velocity is a projection which is represented by a plot beginning at point 505 with a slope which represents a 0.8 g deceleration. Projecting the reference velocity is necessary because vehicle wheel slip has increased to the extent that the measured vehicle wheel velocity is no longer an accurate reflection of the vehicle speed. The projection beginning at point 505 is a projection of reference velocity which is based upon an estimate of the deceleration capability of the vehicle itself. As a result of continued application of brake force, wheel velocity continues to decrease until it is less than the projected reference velocity (as shown as point 506 at FIG. 4A). At this point, pilot control isolation valve 26 ceases modulation and maintains pilot system pressure constant (as shown in region 3 of FIG. 4B). Projection of reference velocity as a decelerating velocity of 0.8 g ceases and is held constant throughout region 3. Next, ECU 20 searches for a wheel velocity deceleration greater than 3 g. When a 3 g wheel deceleration is detected (shown as point 508 in FIG. 4A), ECU 20 provides a command to exhaust valve 16 to exhaust pilot system 111 pressure with a target objective of 0 psig. Pilot system 111 pressure falls as shown in region 4 of FIG. 4B. The reference velocity value 509 and the pilot system air pressure 550 at the time exhaust valve 16 is opened are stored for later use. Next, ECU 20 searches for a wheel velocity minimum (which occurs at point 510 of FIG. 4A). The reference velocity is held constant throughout region 4. When this minimum is detected, exhaust valve 16 is closed trapping any air that may be present in pilot system 111. The pressure of the air in pilot system 111 at this time (point 552) is referred to as the residual hold pressure. At this point, the brake force is at a cycle minimum and the vehicle wheel begins to roll back up to vehicle speed. The rate at which the vehicle wheel rolls up is a function of the coefficient of friction of the vehicle wheel/ground interface, the load condition of the respective vehicle wheel and the residual hold pressure which may remain in the system providing residual brake force. The coefficient of friction and load condition provide a friction force which is a direct function of the ability to translate brake force into vehicle deceleration. Therefore, by monitoring the characteristics of the wheel as it starts to roll back up to vehicle speed, a determination of the friction force available may be made and used in the subsequent cycle to adapt control system performance parameters. To implement this strategy, the rate at which the vehicle wheel rolls up is continuously monitored from the time at which the minimum wheel velocity is detected until the wheel velocity equals a predetermined value, such as; 11.2 ft/s greater than the minimum velocity (shown at point 512 in FIG. 4A). The elapsed time of the roll up interval and the residual hold pressure are used to establish values for system operation parameters which are based upon the respective friction force available for brake force application. These parameters include;
1. REFERENCE DECELERATION FACTOR,
2. PERCENT OF LOCK PRESSURE FOR REAPPLY TARGET,
3. DECELERATION VALUE FOR SUBSEQUENT CYCLE PILOT PRESSURE RESTRICTED RISE RATE, AND
4. DECELERATION VALUE FOR SUBSEQUENT CYCLE EXHAUST.

In operation, the residual hold pressure and the roll up time serve as independent variables which are used to enter a lookup table and select values for the aforementioned parameters. The relationship between the residual hold pressure, roll up time and the various parameters has been established by empirical testing. An example of how these independent variables relate to the specific control parameters in a tandem control drive axle system is as follows:

| psi | milliseconds | | | | | |
|---|---|---|---|---|---|---|
| | 0-30 | 30-60 | 60-150 | 150-240 | 240-360 | 360-ON |
| 40-ON | 1 | 1 | 1 | 1 | 1 | 1 |
| 32-40 | 1 | 1 | 1 | 1 | 2 | 2 |
| 24-32 | 1 | 1 | 1 | 1 | 2 | 3 |
| 16-24 | 1 | 1 | 1 | 2 | 3 | 4 |
| 8-16 | 1 | 1 | 2 | 3 | 4 | 5 |
| 0-8 | 1 | 2 | 3 | 4 | 5 | 6 | where the specific numerical references equate to;

| | 1 | 2 | 3 | 4 | 5 | 6 |
|---|---|---|---|---|---|---|
| reference deceleration factor | 1 | 3 | 7 | 12 | 20 | 255 |
| percent of lock pressure for reapply target | 60 | 50 | 40 | 30 | 20 | 0 |
| deceleration value for subsequent cycle pilot pressure restricted rise rate | .7 | .57 | .44 | .31 | .18 | .05 |
| deceleration value for subsequent cycle exhaust | 3.0 | 2.44 | 1.88 | 1.32 | .76 | .20 |

During the roll up interval itself (see region 5), the only system operation parameter which is continuously updated is the reference velocity. That is, a new reference velocity is calculated beginning from the reference velocity value 514 (which is equal to 509). The reference velocity decrease is continuously updated by determining the vehicle wheel roll up increment and dividing by a REFERENCE DECELERATION FACTOR (which has been extracted from the lookup table). This value is then subtracted from the previous reference velocity. This process continues until the vehicle wheel reaches a velocity of 11.2 ft/s greater than the minimum velocity. At the end of the roll up interval, the roll up time at the end of the interval and the residual hold pressure are used to index the lookup table and extract values for system operation parameters. When this process has been completed, pilot control isolation valve 26 is modulated effecting a pilot system pressure rise rate which is limited to 320 psi/s until reaching a value equal to PERCENT OF LOCK PRESSURE FOR REAPPLY TARGET times the pressure value 550 stored when exhaust valve 16 was opened. This value is shown as point 1000 in region 6 of FIG. 4B. Upon reaching point 1000, pilot control isolation valve ceases modulation and holds pilot system 111 pressure constant. During this portion of the antilock cycle, the reference velocity is decreasing at a rate which is based upon the REFERENCE DECELERATION FACTOR value extracted from the lookup table at the completion of the roll up interval. When the reference velocity and the wheel velocity are equal (as shown at point 516 in FIG. 4A), the first antilock cycle is complete.

Figure 5A:
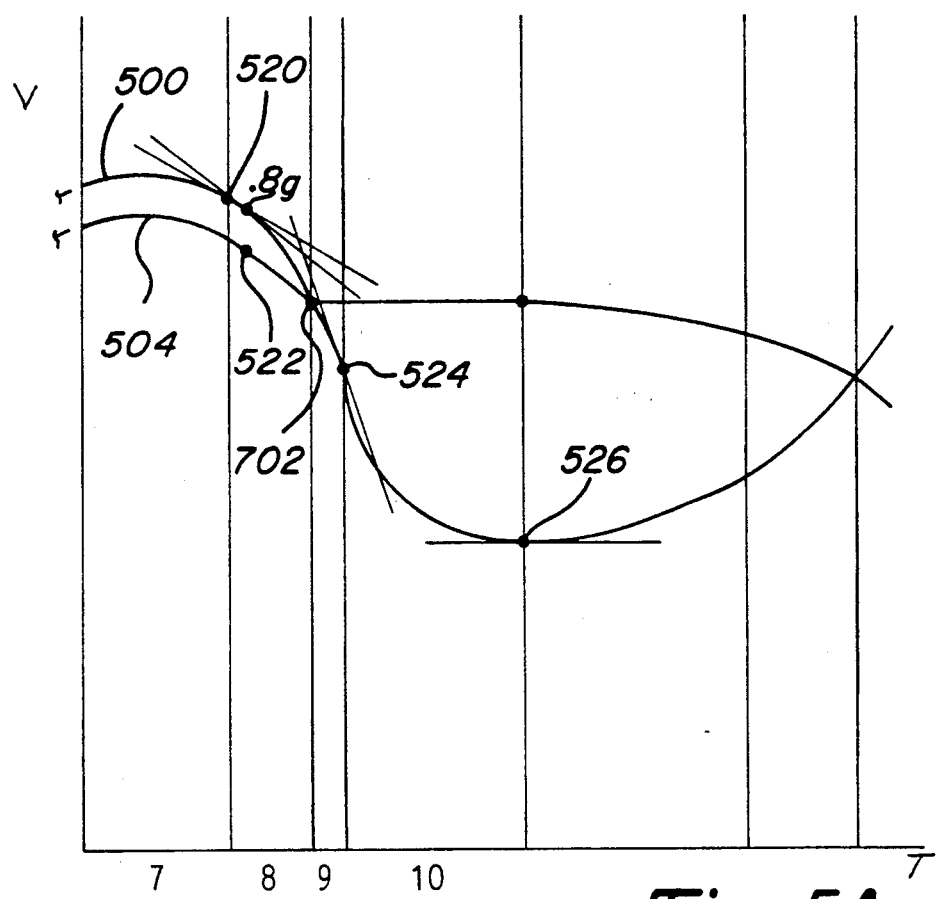
FIG. 5A illustrates the second and subsequent cycle velocity characteristics of the vehicle wheel and the respective reference velocity during an excess brake force stop.
Figure 5B:
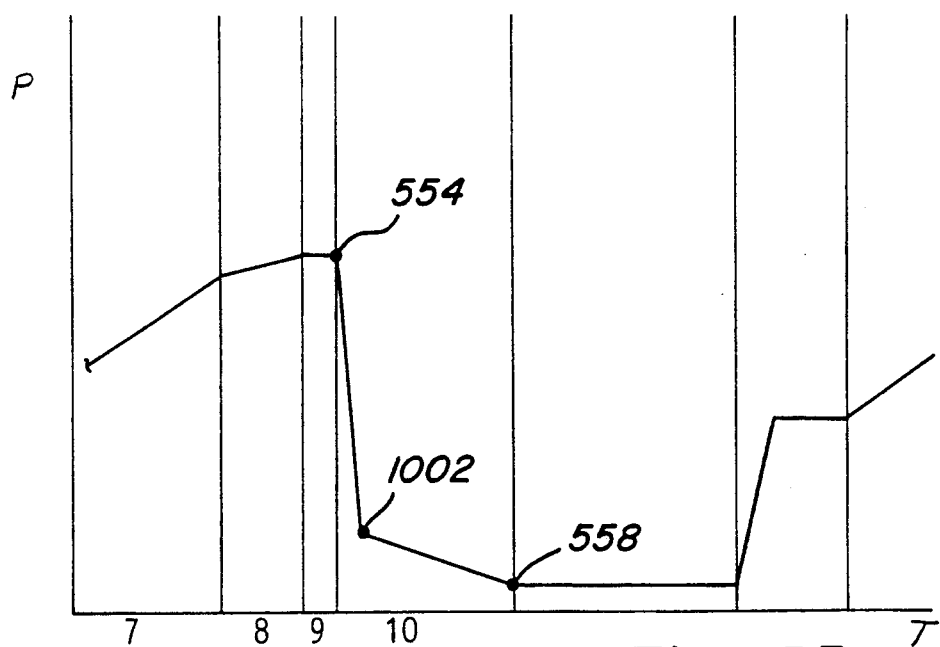
FIG. 5B illustrates the second and subsequent cycle brake system pressure during an excess brake force stop.

After the first antilock cycle has been completed, a new reference is calculated as a value 95% of the actual wheel velocity measured by wheel speed sensor 22 but is restricted to a 0.5 g rise rate. (See FIG. 5A). At the beginning of the second antilock cycle, the pilot control isolation valve 26 begins to modulate so as to admit air into pilot system 111, thereby continuing to build pressure. Modulating pilot control isolation valve 26 limits the pilot pressure rise rate to 105 psi/s in 15 millisecond increments (as shown in region 7 of FIG. 5B). Next, the deceleration of the vehicle wheel is monitored. When the deceleration value is equal to the DECELERATION VALUE FOR SUBSEQUENT CYCLE PILOT PRESSURE RESTRICTED RISE RATE (as shown at point 520) as provided by the lookup table, a further restriction of pilot system pressure rise rate is instituted which limits the pressure rise rate to 64 psi/s in 15 millisecond increments (shown in region 8 of FIG. 5B). This further reduces the rise rate permitting a gradual "creep" toward the anticipated wheel lock condition. When the vehicle wheel deceleration reaches 0.8 g, the reference velocity calculation based upon;

$$0.95 \times \text{vehicle wheel velocity} = \text{reference velocity},$$

is replaced by a reference velocity projection based upon a 0.8 g deceleration rate (as shown beginning at point 522 of FIG. 5A). When the vehicle wheel velocity is reduced to a value less than the projected reference velocity, pilot control isolation valve 26 ceases to modulate pilot system 111 pressure and holds pressure constant (see region 9 of FIG. 5B). When the vehicle wheel deceleration equals the DECELERATION VALUE FOR SUBSEQUENT CYCLE EXHAUST (see point 524 of FIG. 5A), ECU 20 generates a command to exhaust valve 16 to exhaust pilot system 111 pressure. Reference velocity is maintained constant beginning from point 702. The reference velocity value 702 and the pilot system air pressure 554 at the time exhaust valve 16 is opened are stored for later use. The reference velocity is held constant throughout region 9 and 10. Air is vented through exhaust valve 16 until the pilot system 111 pressure equals the PERCENT OF LOCK PRESSURE FOR REAPPLY TARGET times pressure of the pilot system 554 at the time exhaust valve 16 was opened. This value is shown as point 1002 in region 10 of FIG. 5B. When the pilot system pressure reaches point 1002, the pilot system pressure exhaust rate is restricted by modulation of exhaust valve 16 to an exhaust rate of 80 psi/s in 15 millisecond increments (see region 10 of FIG. 5B). Next, ECU 20 searches for a wheel velocity minimum and when this minimum is detected (as shown at point 526 of FIG. 5A), exhaust valve 16 is closed trapping any air which may be present. The pressure of the air in the pilot system at point 558 is referred to as the residual hold pressure. At this point the vehicle wheel will begin to roll back up to vehicle speed. The remainder of this antilock cycle is identical to the antilock cycle previously described from this point forward. All subsequent cycles are a duplication of the second cycle described herein and will be repeated until the vehicle brake system reaches a nonexcess brake force condition or a reference velocity of 5 ft/s.

In operation, a situation may occur in which the reference velocity has been incorrectly calculated based upon road conditions that may have changed since the roll up test was performed. In such an instance wherein the reference velocity is calculated as a value which the vehicle wheel is unable to achieve during roll up, the brakes will never reapply. To address the possibility of this occurrence, the vehicle wheel velocity must be continuously monitored to determine if a maximum value has been reached. That is, if a maximum wheel velocity is encountered before the wheel velocity reaches the reference velocity, an assumption is made that the reference will never be reached. If this occurs, ECU 20 dwells for a fixed period of time and then assesses the pressure in pilot system 111. If the pressure is zero, a conclusion is made that the reference was incorrectly calculated and the reference velocity is recalculated as a value 95% of the vehicle wheel velocity. When this condition is encountered, pressure is reapplied to pilot system 111 by modulation of pilot control isolation valve 26 according to the strategy previously outlined for second and subsequent cycles. If the pressure is not zero, an assumption is made that conditions have changed and the basis for calculation of the reference was incorrect. The pilot pressure is then exhausted to zero and reapplied according to the strategies previously outlined for the second and all subsequent cycles.

In particular, a first embodiment includes an antilock brake system for a vehicle including a brake actuator adapted to provide a brake force to a vehicle wheel to stop the vehicle and a fluid pressure source providing pressure to the actuator in response to a command to brake the vehicle including a device for modulating the fluid pressure to produce a first pressure signal of a first predetermined rate of increase, a device for measuring vehicle wheel deceleration rate, a device for detecting a first vehicle wheel deceleration threshold, a device for modulating the fluid pressure to produce a second pressure signal of a second predetermined rate of increase in response to reaching the first vehicle wheel deceleration threshold, a device for measuring vehicle wheel velocity, a device for establishing a first reference velocity, a device for detecting when the vehicle wheel velocity is equal to the first reference velocity and a device for modulating fluid pressure to produce a third pressure signal of substantially constant value in response to detecting when the vehicle wheel velocity is equal to a first reference velocity. In addition, the present invention includes an embodiment wherein the antilock brake system includes a device for detecting an excess brake force condition, a device for measuring vehicle wheel velocity, a device for detecting a wheel velocity minimum, a device for reducing fluid pressure in response to the excess brake force condition and holding fluid pressure substantially constant when one of the following events occurs; (a) brake system force reaches zero gauge pressure; or (b) vehicle wheel velocity reaches a minimum and begins accelerating.

The present invention further includes an embodiment in which an antilock brake system includes a device for measuring vehicle wheel velocity, a device for detecting a wheel velocity minimum, a device for measuring fluid pressure, a device for detecting an excess brake force condition, a device for storing fluid pressure corresponding to the excess brake force condition, a device for determining when the wheel velocity reaches a predetermined incremental velocity greater than the minimum velocity, and a device for modulating the fluid pressure to increase fluid pressure at a predetermined rate to a predetermined percentage of the fluid pressure corresponding to the excess brake force condition. This embodiment may further include a device for determining road condition and a device for adapting the predetermined percentage to the determined road conditions. In addition, this embodiment may include a device capable of storing a fluid pressure corresponding to the detected vehicle wheel velocity minimum, a device for measuring the elapsed time between the vehicle wheel velocity minimum and the predetermined incremental velocity greater, a device for determining road conditions using the fluid pressure corresponding to the detected wheel velocity minimum and the elapsed time, and a device for adapting the predetermined percentage to the road conditions. It is anticipated that this embodiment may feature a lookup table as the device for determining road conditions. In the alternative, the predetermined percentage may be a fixed value. The lookup table may include values for adapting subsequent antilock cycle control parameters to measured road conditions. These parameters may include; deceleration value for subsequent cycle exhaust; deceleration value for subsequent cycle pilot pressure restricted rise rate; percent of lock pressure for reapply target; and a reference deceleration factor.

In operation the present invention functions according to a method of controlling a brake system in response to a command to brake the vehicle including; in response to a command to brake the vehicle, applying a first pressure signal of a first predetermined rate of increase to the brake system, then measuring a wheel deceleration rate to determine when a first deceleration rate is reached, in response to reaching the first deceleration rate, a second pressure signal of a second predetermined rate of increase is applied to the brake system wherein the second predetermined rate is smaller than the first predetermined rate, then a first reference velocity is established while the wheel velocity is measured and when the wheel velocity is equal to the reference velocity a third pressure signal of substantially constant value is applied. Another method of operation contemplated in the present invention includes detecting an excess brake force condition and reducing brake system pressure until one of the following events occurs; (a) brake system pressure substantially reaches zero gauge, or (b) a measured wheel velocity reaches a minimum value and begins accelerating. Upon detection of either condition the brake system of the present invention holds pressure substantially constant. In another embodiment of the present invention, a method of operation is contemplated in which the maximum cycle pressure corresponding to an excess brake force condition is determined; then a determination is made when the wheel velocity reaches a minimum and begins accelerating and reaches a predetermined incremental velocity greater than the minimum, and increasing the brake system pressure at a predetermined rate to a predetermined percentage of the maximum cycle pressure. The predetermined percentage may be based upon measured road conditions which may be determined by using two independent variables including residual hold pressure corresponding to brake system pressure when the wheel velocity reaches the minimum value and the elapsed time between the wheel velocity reaching the minimum value and the wheel velocity reaching the predetermined incremental value above the minimum value. The referenced independent variables may be used to access a lookup table to determine the predetermined percentage. In the alternative the predetermined percentage may be a fixed value. Another method of operation of the present invention contemplates performing a rollup test by determining brake system pressure coincident with the wheel velocity reaching the minimum value and measuring elapsed time between the occurrence of the wheel velocity minimum value and a predetermined incremental velocity greater than the wheel velocity minimum value wherein the predetermined percentage is determined in accordance with the determined pressure and the elapsed time. The method further includes establishing a reference velocity and wherein the predetermined percentage is maintained constant until the wheel velocity equals the reference velocity. The reference velocity may be based upon measured road conditions. Another method includes controlling the brake system in response to a command to brake the vehicle including determining a deceleration threshold in response to measured road conditions, then applying a first pressure signal of a first predetermined rate of increase to the brake system, while measuring wheel deceleration rate to determine when a first decelerate based upon a deceleration threshold is reached and in response to reaching the first deceleration rate, applying a second pressure signal of a second predetermined rate of increase to the brake system wherein the second predetermined rate is smaller than the first predetermined rate. The deceleration threshold may be determined by determining the residual hold pressure corresponding to the brake system pressure when the wheel velocity reaches a minimum value and measuring an elapsed time between the wheel velocity reaching the minimum value and the wheel velocity reaching a predetermined incremental velocity above the minimum value and using a residual hold pressure and the elapsed time to determine the deceleration threshold. The residual hold pressure and the elapsed time may be used as independent variables to access a lookup table to thereby determine the deceleration threshold. The method contemplated by the present invention includes establishing a first reference velocity, measuring a wheel velocity, to determine when the wheel velocity is equal to the first reference velocity and in response to determining that the wheel velocity is equal to the first reference velocity applied, applying a third pressure signal of substantially constant value. Another method contemplated includes determining a deceleration threshold and a target exhaust value in response to measured road conditions, measuring a wheel deceleration rate to determine when the deceleration threshold is reached, in response to reaching the deceleration threshold, reducing brake system pressure until one of the following events occurs; (a) brake system pressure substantially reaches the target exhaust value, or (b) a measured wheel velocity reaches a minimum value and begins accelerating. The target exhaust value may be determined by determining a residual hold pressure corresponding to the brake system pressure when the wheel velocity reaches the minimum value, measuring an elapsed time between the wheel velocity reaching the minimum value and the wheel velocity reaching a predetermined incremental velocity above the minimum value and using the residual hold pressure and elapsed time to determine the target exhaust value. The residual hold pressure and the elapsed time may be used to access a lookup table to determine the target exhaust value. In another method contemplated by the present invention of controlling the brake system includes detecting an excess brake force condition, reducing brake system pressure at a first rate to a nonzero target value whereupon the brake system pressure is further reduced at a lesser rate than the first rate, determining when the wheel velocity reaches a minimum value and begins accelerating and after the wheel velocity reaches the minimum value holding brake system pressure constant. The excess brake force condition can be based upon measured road conditions which may be determined by determining the residual hold pressure corresponding to the brake system pressure when the wheel velocity reaches the minimum value, measuring the elapsed time between the wheel velocity reaching the minimum value and the wheel velocity reaching a predetermined incremental velocity above the minimum value and using the residual hold pressure and elapsed time to determine the excess brake force condition. The residual hold pressure and the elapsed time may be used to access a lookup table to determine the excess brake force condition and in the alternative, the excess brake force condition may be a fixed value. The target exhaust value may also be based upon measured road conditions which can be determined by determining a residual hold pressure corresponding to a brake system pressure when the wheel velocity reaches a minimum value and measuring an elapsed time between the wheel velocity reaching a minimum value and the wheel velocity reaching a predetermined incremental velocity above the minimum value and using a residual hold pressure and elapsed time to determine the target exhaust value. The residual hold pressure and the elapsed time may be used to access a lookup table to determine the target exhaust value. In the alternative, the target exhaust value may be a fixed value. Another method contemplated includes determining a maximum cycle pressure corresponding to the excess brake force condition, determining when the wheel velocity reaches a predetermined incremental velocity above the minimum velocity and after the wheel velocity reaches a predetermined incremental velocity, increasing brake system pressure at a predetermined rate to a percentage of the maximum cycle pressure.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. An antilock brake system for a vehicle including a brake actuator adapted to provide a brake force to a vehicle wheel to stop said vehicle and a fluid pressure source supplying pressure to the actuator in response to a command to brake the vehicle comprising;
    means for continuously modulating said fluid pressure to produce a first pressure signal which is increasing at a first predetermined rate of increase;
    means for measuring vehicle wheel deceleration rate;
    means for continuously detecting a first vehicle wheel deceleration threshold;
    means for modulating said fluid pressure to produce a second pressure signal of a second predetermined rate of increase in response to reaching said first vehicle wheel deceleration threshold;
    means for measuring vehicle wheel velocity;
    means for establishing a first reference velocity;
    means for detecting when said vehicle wheel velocity is equal to said first reference velocity; and
    means for modulating said fluid pressure to produce a third pressure signal of substantially constant value in response to detecting when said vehicle wheel velocity is equal to said first reference velocity.

2. The invention of claim 1 further comprising;
    means for detecting an excess brake force condition;
    means for detecting a wheel velocity minimum;
    means for reducing fluid pressure in response to detecting said excess brake force condition and holding fluid pressure substantially constant when one of the following events occurs;
        (a) brake system pressure reaches zero gauge pressure; or
        (b) vehicle wheel velocity reaches a minimum and begins accelerating.

3. An antilock brake system for a vehicle including a brake actuator adapted to provide a brake force to a vehicle wheel to stop said vehicle and a fluid pressure source supplying pressure to the actuator in response to a command to brake the vehicle comprising;
    means for measuring vehicle wheel velocity;
    means for detecting a wheel velocity minimum;
    means for measuring fluid pressure;
    means for detecting an excess brake force condition;
    means for storing fluid pressure corresponding to said excess brake force condition;
    means for determining when said wheel velocity reaches a predetermined incremental velocity greater than said minimum velocity;
    means for modulating said fluid pressure to increase fluid pressure at a predetermined rate to a predetermined percentage of said fluid pressure corresponding to said excess brake force condition;
    means for storing a fluid pressure corresponding to said detected vehicle wheel velocity minimum;
    means for measuring an elapsed time between said vehicle wheel velocity minimum and said predetermined incremental velocity greater;
    means for determining road condition using said fluid pressure corresponding to said detected vehicle wheel velocity minimum and said elapsed time; and
    means for adapting said predetermined percentage to said road conditions.

4. The antilock brake system as in claim 3 wherein said means for determining road condition comprises a look up table.

5. The antilock brake system as in claim 4 wherein said look up table includes values for adapting subsequent antilock cycle control parameters to measured road conditions.

6. The antilock brake system as in claim 5 wherein said parameters include;
    deceleration value for subsequent cycle exhaust;
    deceleration value for subsequent cycle pilot pressure restricted rise rate;
    percent of lock pressure for reapply target; and
    a reference deceleration factor.

7. A method of controlling a brake system in response to a command to brake a vehicle comprising;
    in response to all commands to brake the vehicle, applying a first pressure signal which is increasing at a first predetermined rate of increase to said brake system;
    measuring a wheel deceleration rate to determine when a first deceleration rate is reached;
    in response to reaching said first deceleration rate, applying a second pressure signal of a second predetermined rate of increase to said brake system, said second predetermined rate being smaller than said first predetermined rate;
    establishing a fist reference velocity;
    measuring a wheel velocity to determine when said wheel velocity is equal to said first reference velocity;
    in response to determining that said wheel velocity is equal to said first reference velocity, applying a third pressure signal of substantially constant value.

8. A method of claim 7 further comprising the steps of;
  detecting an excess brake force condition;
  in response to detecting said excess brake force condition, reducing brake system pressure until one of the following events occurs:
    (a) brake system pressure substantially reaches zero gauge pressure;
    (b) a measured wheel velocity reaches a minimum value and begins accelerating.

9. The method of claim 8 further comprising holding said brake system pressure substantially constant after one of said events occurs.

10. A method of controlling a brake system comprising:
  determining a maximum cycle pressure corresponding to an excess brake force condition;
  determining when a wheel velocity reaches a minimum value and begins accelerating;
  determining when a wheel velocity reaches a predetermined incremental velocity above said minimum velocity;
  after said wheel velocity reaches said predetermined incremental velocity, increasing brake system pressure at a predetermined rate to a predetermined percentage of said maximum cycle pressure.

11. The method of claim 10 further comprising determining said predetermined percentage by:
  determining a residual hold pressure corresponding to the brake system pressure when said wheel velocity reaches said minimum value;
  measuring an elapsed time between said wheel velocity reaching said minimum value and said wheel velocity reaching said predetermined incremental velocity above said minimum value;
  using said residual hold pressure and said elapsed time to determine said predetermined percentage.

12. The method of claim 11 further comprising using said residual hold pressure and said elapsed time to access a lookup table to thereby determine said predetermined percentage.

13. The method of claim 10 further comprising:
  performing a roll up test by determining brake system pressure coincident with said wheel velocity reaching said minimum value and measuring elapsed time between occurrence of said wheel velocity minimum value and a predetermined incremental velocity greater than said wheel velocity minimum value;
  wherein said predetermined percentage is determined in accordance with said determined system pressure and said elapsed time.

14. The method of claim 10 further comprising:
  establishing a reference velocity; and
  wherein said predetermined percentage is maintained constant until said wheel velocity equals said reference velocity.

15. The method of claim 14 further comprising determining said reference velocity by:
  determining a residual hold pressure corresponding to the brake system pressure when said wheel velocity reaches said minimum value;
  measuring an elapsed time between said wheel velocity reaching said minimum value of said wheel velocity reaching said predetermined incremental velocity above said minimum value;
  using said residual hold pressure, said elapsed time and wheel velocity to determine said reference velocity.

16. The method of claim 15 further comprising using said residual hold pressure and said elapsed time to determine said reference velocity.

17. The method of claim 16 wherein said residual hold pressure and said elapsed time are used to access a lookup table to thereby determine said reference velocity.

18. The method of claim 14 further comprising increasing brake system pressure in response to occurrence of said wheel velocity becoming equal to said reference velocity.

19. A method of controlling a brake system in response to a command to brake a vehicle comprising;
  determining a first deceleration threshold in response to measured road conditions;
  in response to said command to brake the vehicle, applying a first pressure signal of a first predetermined rate of increase to said brake system;
  measuring a wheel deceleration value to determine when said first deceleration threshold is reached;
  in response to reaching said first deceleration threshold, applying a second pressure signal of a second predetermined rate of increase to said brake system, said second predetermined rate being smaller than said first predetermined rate.

20. The method of claim 19 further comprising determining said deceleration threshold by:
  determining a residual hold pressure corresponding to brake system pressure when said wheel velocity reaches a minimum value;
  measuring an elapsed time between said wheel velocity reaching said minimum value and said wheel velocity reaching a predetermined incremental velocity above said minimum value;
  using said residual hold pressure and said elapsed time to determine said deceleration threshold.

21. The method of claim 20 further comprising using said residual hold pressure and said elapsed time to access a lookup table to thereby determine said deceleration threshold.

22. The method of claim 19 further comprising:
  establishing a first reference velocity;
  measuring a first reference velocity;
  measuring a wheel velocity to determine when said wheel velocity is equal to said first reference velocity;
  in response to determining that said wheel velocity is equal to said first reference velocity, applying a third pressure signal of substantially constant value.

23. A method of claim 19 further comprising:
  determining a second deceleration threshold and a target exhaust value in response to measured road conditions;
  measuring a wheel deceleration value to determine when said second deceleration threshold is reached;
  in response to reaching said second deceleration threshold, reducing brake system pressure until one of the following events occurs:
    (a) brake system pressure substantially reaches said target exhaust value;
    (b) a measured wheel velocity reaches a minimum value and begins accelerating.

24. The method of claim 23 further comprising determining said target exhaust value by:
  determining a residual hold pressure corresponding to the brake system pressure when said wheel velocity reaches said minimum value;
  measuring an elapsed time between said wheel velocity reaching said minimum value and said wheel velocity reaching a predetermined incremental velocity above said minimum value;
  using said residual hold pressure and said elapsed time to determine said target exhaust value.

25. The method of claim 24 further comprising using said residual hold pressure and said elapsed time to access a lookup table to thereby determine said target exhaust value.

26. The method of claim 23 further comprising determining said deceleration threshold by:
  determining a residual hold pressure corresponding to the brake system pressure when said wheel velocity reaches said minimum value;
  measuring an elapsed time between said wheel velocity reaching said minimum value and said wheel velocity reaching a predetermined incremental velocity above said minimum value;
  using said residual hold pressure and said elapsed time to determine said deceleration threshold.

27. The method of claim 26 further comprising using said residual hold pressure and said elapsed time to access a lookup table to thereby determine said deceleration threshold.

28. A method of controlling a brake system comprising:
  detecting an excess brake force condition by determining a residual hold pressure corresponding to the brake system pressure when said wheel velocity reaches said minimum value;
  measuring an elapsed time between said wheel velocity reaching said minimum value and said wheel velocity reaching a predetermined incremental velocity above said minimum value;
  using said residual hold pressure and said elapsed time to determine said excess brake force condition;
  in response to detecting said excess brake force condition, reducing brake system pressure at a first rate to a non-zero target exhaust value;
  in response to reaching said non-zero target exhaust value, further reducing brake system pressure at a rate lesser than said first rate;
  determining when a wheel velocity reaches a minimum value and begins accelerating;
  after said wheel velocity reaches said minimum value holding brake system pressure constant.

29. The method of claim 28 further comprising using said residual hold pressure and said elapsed time to access a lookup table to thereby detect said excess brake force condition.

30. The method of claim 28 wherein said excess brake force condition is based on a fixed value.

31. The method of claim 28 wherein said target exhaust value is based upon measured road conditions.

32. The method of claim 28 further comprising determining said target exhaust value by:
  determining a residual hold pressure corresponding to the brake system pressure when said wheel velocity reaches said minimum value;
  measuring an elapsed time between said wheel velocity reaching said minimum value and said wheel velocity reaching a predetermined incremental velocity above said minimum value;
  using said residual hold pressure and said elapsed time to determine said target exhaust value.

33. The method of claim 32 further comprising using said residual hold pressure and said elapsed time to access a lookup table to thereby determine said target exhaust value.

34. The method of claim 28 wherein said target exhaust value is a fixed value.

35. The method of claim 28 further comprising:
  determining a maximum cycle pressure corresponding to said excess brake force condition;
  determining when a wheel velocity reaches a predetermined incremental velocity above said minimum velocity;
  after said wheel velocity reaches said predetermined incremental velocity, increasing brake system pressure at a predetermined rate to a percentage of said maximum cycle pressure.

36. The method of claim 28 wherein after said wheel velocity reaches said predetermined incremental velocity, increasing brake system pressure at a predetermined rate to a percentage of said maximum cycle pressure based on measured road conditions.

* * * * *